(12) United States Patent
Chin et al.

(10) Patent No.: US 7,371,448 B2
(45) Date of Patent: May 13, 2008

(54) PHASE-CHANGE RECORDING MEDIA BASED ON THE GA-SB-TE SYSTEM FOR ULTRA-HIGH DENSITY OPTICAL RECORDING

(75) Inventors: Tsung Shune Chin, Hsinchu (TW); Chien Ming Lee, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 480 days.

(21) Appl. No.: 11/013,470

(22) Filed: Dec. 17, 2004

(65) Prior Publication Data

US 2005/0136209 A1 Jun. 23, 2005

(30) Foreign Application Priority Data

Dec. 19, 2003 (TW) .............................. 92136070 A (51) Int. Cl.
*B32B 3/02* (2006.01)

(52) U.S. Cl. .................... 428/64.1; 428/64.4; 428/64.5; 428/64.6; 430/270.13

(58) Field of Classification Search ............... 428/64.1, 428/64.4, 64.5, 64.6; 430/270.13
See application file for complete search history.

(56) References Cited

U.S. PATENT DOCUMENTS 5,761,188 A * 6/1998 Rosen et al. ............. 369/275.2
7,033,659 B2 * 4/2006 Shirai et al. ............... 428/64.1

FOREIGN PATENT DOCUMENTS

JP 200391884 * 3/2003

* cited by examiner

Primary Examiner—Elizabeth Mulvaney (57) ABSTRACT

This invention discloses a novel rewritable phase-change recording medium for optical data storage, which is based on the GaSbTe ternary alloy system. The designed compositions reside on the $Sb_7Te_3$—GaSb and $Sb_2Te_3$—GaSb pseudo-binary tielines, and the claimed region can be expressed by the formula $(Sb_xTe_{100-x})_{1-z}(Ga_ySb_{100-y})_z$, $35 \leq x \leq 80$, $40 \leq y \leq 50$, $0.05 \leq z \leq 0.9$. The crystallized phase of the GaSbTe films is a single phase after laser annealing, and the crystal structure is hexagonal with continuous variation in lattice constants. The lattice parameters, a is from 4.255 Å to 4.313 Å and c is from 11.200 Å to 11.657 Å, corresponding to the c/a ratio 2.60 to 2.73. The crystallization kinetics shows increased crystallization temperature (181 to 327° C.) and activation energy (2.8 to 6.5 eV) with increasing GaSb content. The $Sb_7Te_3$-rich compositions in the GaSbTe recording media are characteristic of enhanced recrystallization, while those with increasing GaSb content are indicative of higher rate of crystal growth and better erasability. The compositions around $Ga_2Sb_5Te_3$ exhibit the features of nearly complete erasure and stable cycling performance.

4 Claims, 12 Drawing Sheets

PHASE-CHANGE RECORDING MEDIA BASED ON THE GA-SB-TE SYSTEM FOR ULTRA-HIGH DENSITY OPTICAL RECORDING

RELATED APPLICATIONS

The present application is based on, and claims priority from, Taiwan Application number 092136070, filed Dec. 19, 2003, the disclosure of which is hereby incorporated by reference herein in its entirety.

FIELD OF THE INVENTION

The present invention is related to an optical recording medium for information storage and retrieve. In particular the present invention discloses a rewritable optical recording material system, which undergoes a phase change between the crystalline and amorphous states upon irradiation of a signal laser beam, thus enabling recording, erasing, reproduction and over-writing, and the rewritable optical disks thereof.

BACKGROUND OF THE INVENTION

An erasable phase-change optical disk utilizes a phase change between the crystalline and amorphous states of a recording layer to accomplish the functions of writing and erasing. The working principles of the erasable phase-change optical disk will be introduced in conjunction with typical prior art references hereinafter for a better understanding of the present invention.

Figure 1:
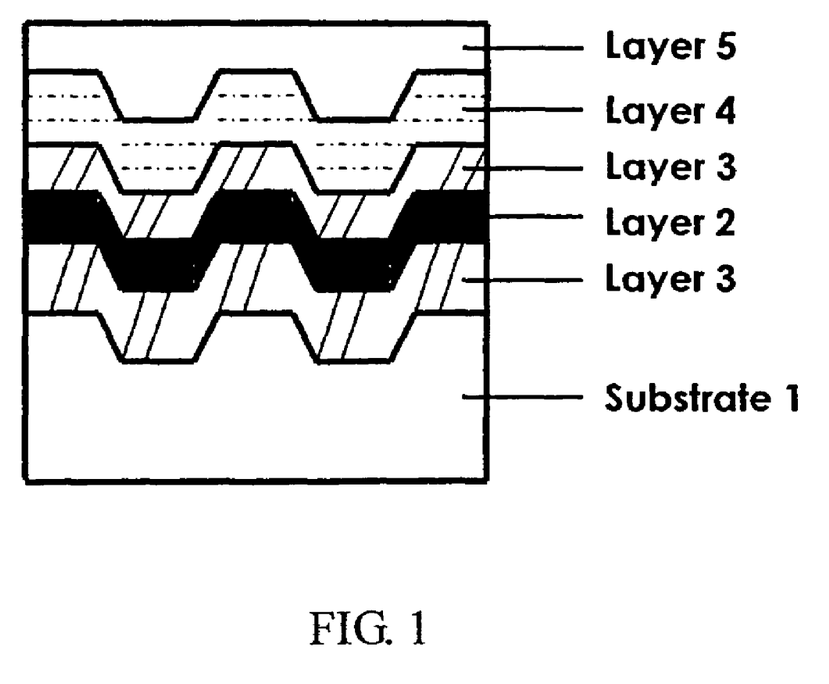
FIG. 1 is a sectional view showing a structure of a conventional erasable phase-change optical disk.

A typical erasable phase-change optical disk is shown in FIG. 1, which comprises a phase-change recording layer 2 interposed between an upper dielectric layer and a lower dielectric layer 3 on a substrate 1, a reflective layer 4 on the upper dielectric layer, and a plastic protection layer 5 on the reflective layer 4. A suitable material for making the dielectric layers 3 is $SiO_2$—ZnS. The substrate 1 may be formed of polymethyl methacrylate, polycarbonate or a glass. Suitable materials for forming the reflective layer 4 include Au, Cu, Al, Ni, Cr, Pt, Pd and an alloy thereof.

The currently used erasable phase-change optical disks utilize a chalcogenide material based on Te or Se as the recording layer. When a region of the recording layer is subjected to a rapid heating to a molten state upon irradiation of a focused laser beam with a high power short pulse modulation, the region will be conductively quenched by the adjacent layers (e.g. the dielectric layers and reflective layer) to an amorphous state, so that a recording mark is formed. The amorphous recording mark has a reflectance lower than that of the blank crystalline region (for some special alloys the reflectance of amorphous recording mark is higher), and the difference in reflectance is used for reproduction of signals. A medium power and long pulse laser beam is used to erase the recording mark, which resumes the blank crystalline region by heating to a temperature between its melting point and crystallization point.

The chalcogenide material was first used as the phase-change recording layer by S. R. Ovsinsky, et al. in U.S. Pat. No. 3,530,441, wherein thin films of Te.sub.85 Ge.sub.15 and Te.sub.81 Ge.sub.15 S.sub.2 Sb.sub.2 produce a reversible phase-transition according to irradiation with high energy density light such as the laser beam. Thereafter, most of the research works have concentrated on the chalcogenide materials, for examples GeTe, InSe, InSeTl, InSeTlCo, GeSbTe, GeTeSn, GeTeAs, GeTeSnAu, InTe, InSeTe, InSbTe, and SbSeTe, etc. all pertain to the chalcogenide material. Among them, the series of GeSbTe alloys developed by Matsushita Electric Industrial Co., Ltd., Japan, in U.S. Pat. Nos. 5,233,599; 5,278,011; and 5,294,523 are the most promising ones. The details of these patents are hereby incorporated by reference in their entirety.

In the GeTe—$Sb_2Te_3$ pseudo-binary alloy system, three intermetallic compounds exist in between the GeTe and $Sb_2Te_3$ terminal compounds. They are, in sequence, $Ge_2Sb_2Te_5$, $GeSb_2Te_4$ and $GeSb_4Te_7$. Yamada et al. of Matsushita heavily studied these pseudo-binary alloys, and disclosed their results in the Journal of Applied Physics 69(5), pp. 2849 (1991). They found that the laser-induced crystallization time for the amorphous film can be smaller than 100 ns that decrease with increasing $Sb_2Te_3$. When the composition deviate the pseudo-binary line, the crystallization time rapidly increases. Crystallization temperature, around 200° C. lowers with increasing $Sb_2Te_3$. A metastable FCC structure forms at the onset of crystallization, it then converts to a stable HCP structure.

With decreasing spot size of the laser while constant increase of recording density, new recording media with faster and faster crystallization speed is drastically needed to improve data transfer rate. Scientists in Philip found that the compositions at around $Sb_{70}Te_{30}$ in the same GeSbTe system are characteristic of superior crystallization capability (see the Japanese Journal of Applied Physics 40, p. 1592 (2001)). These compositions show low nucleation rate while high growth rate, hence were called growth driven or fast growth type of optical recording media. Traditional GeSbTe compositions, such as $Ge_2Sb_2Te_5$, belong to nucleation driven type of optical media, and is characteristic of large amount of nuclei formation together with grain growth. The crystallization speed depends on the time required for nucleation and growth. While for growth driven type of media, crystallization proceeds with the enlargement of existing nuclei at the peripheral of amorphous recording spots. Time for crystallization depends on only the time for grain growth that favors the ever smaller recording bits.

The growth driven materials in use are, among others, AgInSbTe of Ricoh, InGeSbTe of Phlip, those are compositions near $Sb_{70}Te_{30}$, with a modification using Ag, In, and/or Ge to tailor the crystallization behavior. The present invention proposes a new alloy system based on GaSbTe ternary alloys possessing high growth driven crystallization speed and is suitable for the media of high recording density using blue lasers.

SUMMARY OF THE INVENTION

The recording density of a phase-change optical disk is closely related to the disk structure and the optical system. The narrower the track pitch and the smaller the focused laser spot are, the higher is the recording density. The spot size of a focused laser beam is determined mainly by the numerical aperture (NA) of the objective lens and the wavelength of laser. The laser diodes used in CD players nowadays are with wavelengths of 830 nm and 780 nm, while for DVD player, 630 nm or 650 nm. In the near future, blue lasers with wavelengths around 405 nm coupling with objective lens of higher NA are projected for higher density recording. With the increase in recording density, the way to enhance data transfer rate becomes an important issue. The maximum data transfer rate is determined by erasing velocity of the recorded amorphous spots, that is to say, the crystallization time. Upon the reduction in spot size while the increase in rotation speed of the disk, the time of heating arisen from the pulsed laser becomes limited, and the time for crystallization is much shortened. It is the key role of minimizing crystallization time in the enhancement of recording density. The shorter the crystallization time the shorter the time is required for erasure. The main purpose of the current invention is to provide a new material system that is capable of high crystallization ability extending for the purpose of high density optical recording.

The basic design lies in the addition of a IIIB element Ga into Sb—Te binary alloys to adjust crystallization parameters in order to achieve high crystallization speed. $Sb_{70}Te_{30}$ and $Sb_2Te_3$ were chosen as the starting points for adjustment of compositions. $Sb_{70}Te_{30}$ is characteristic of fast growth, Ge has been added to enhance the stability of its amorphous state. We designed the modification of $Sb_{70}Te_{30}$ with the compound GaSb that has a high melting point in view of increasing activation energy of crystallization due to the Ga therein, and increasing the Sb/Te ratio by the Sb therein. $Sb_2Te_3$ is characteristic of high crystallization rate yet with low thermal stability. In order to increase its crystallization temperature and activation energy of crystallization, GaSb was designed to modify the resultant performance. Thus, two series of pseudo-binary alloys were designed. One lies along the tie-line $Sb_7Te_3$—GaSb (tie-line 1), the other along $Sb_2Te_3$—GaSb (tie-line 2).

Figure 2:
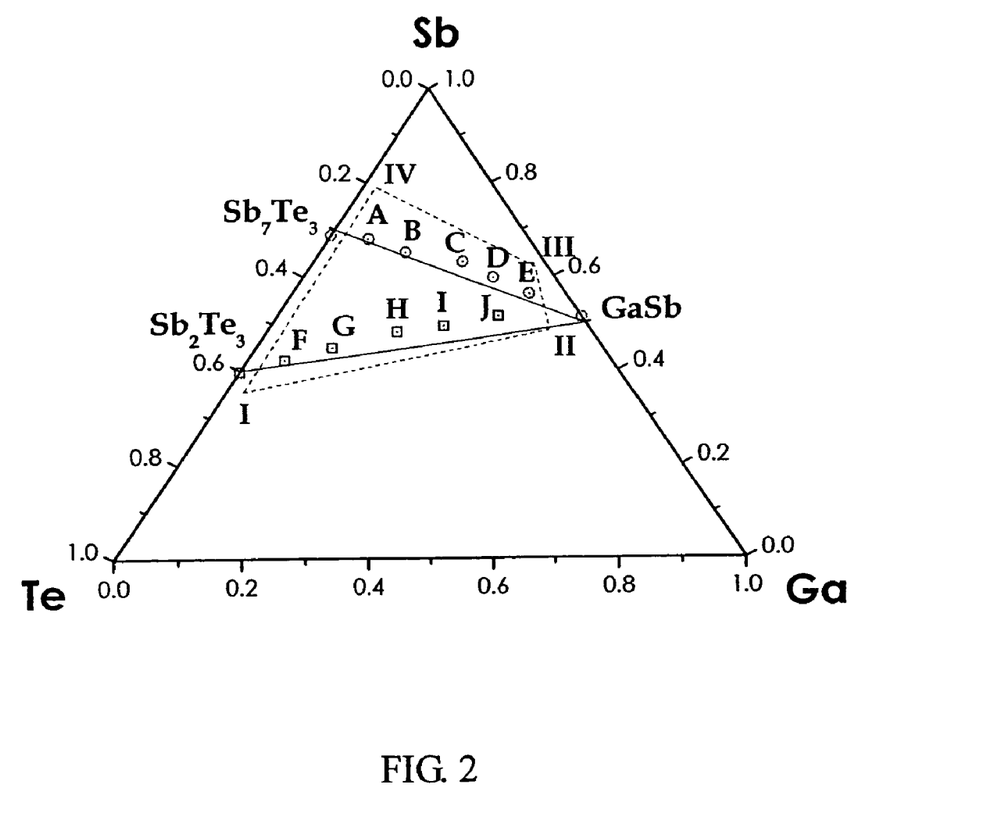
FIG. 2 is the composition range of the designed GaSbTe ternary alloys.

FIG. 2 shows the designed and studied alloy compositions, they are bounded with points I, II, III, and IV, and can be represented by the formulae shown below:

$35 \leq x \leq 80; 40 \leq y \leq 50; 0.05 \leq z \leq 0.9$,

Whereas three reference compositions locates at x=40, 70, z=0; and y=50, z=1 were designed to represent $Sb_2Te_3$, $Sb_7Te_3$ and GaSb, respectively.

Thin films of the designed alloy compositions were prepared using conventional sputtering or vapor-deposition processes. Thermal properties of the films were then explored to calculate crystallization parameters. Optimal compositions selected from the crystallization study were then fabricated into optical disks for dynamic writing and erasing tests.

The present invention also provides a rewritable phase-change optical disk comprising a substrate; a rewritable phase-change optical recording layer deposited on said substrate, wherein said rewritable phase-change optical recording layer has a composition of said rewritable phase-change optical recording composition of the present invention.

Preferably, the group of compositions disclosed has a crystallization temperature ranging from 180 to 350 degree C.

Preferably, the group of compositions disclosed has only one crystallized phase that is hexagonal.

Preferably, the group of compositions disclosed has a crystallization activation energy ranging from 2.8 to 6.5 eV at the crystallization temperature.

Preferably, the group of compositions disclosed has lattice parameters in the crystalline phase a from 4.255 Å to 4.313 Å, c from 11.200 Å to 11.657 Å, and c/a ratio 2.60 to 2.73.

Preferably, the group of compositions disclosed has the best performance at compositions around the formulae represented by $Ga_2Sb_5Te_3$.

Preferably, the group of compositions disclosed may contain 0.5 to 10 at. % one or combination of In, Ag, Au, Bi, Sn, Ge, B, C, N in place of Ga, Sb or Te once the crystallized structure hexagonal is sustained with lattice parameter a 4.25 to 4.32 Å, c 11.200 to 11.657 Å, c/a ratio 2.58 to 2.72.

BRIEF DESCRIPTION OF THE DRAWINGS

FIG. 3 is the crystallization temperature ($T_x$) of the designed alloys, (a) Examples A-E and the References $Sb_7Te_3$, GaSb; (b) Examples F-J and the Reference GaSb.

FIG. 4 is the activation energy ($E_a$) of crystallization of the designed alloys, (a) Examples A-E and the References $Sb_7Te_3$, GaSb; (b) Examples F-J and the Reference GaSb.

FIG. 5 is the lattice constants of the crystallized phase of the designed alloys, (a) Examples A-E and the References $Sb_7Te_3$, GaSb; (b) Examples F-J and the References $Sb_2Te_3$, GaSb.

FIG. 9 is the cyclic writing-erasing test results of three Example alloys: (a) Example A, (b) Example B, and (c) Example H.

FIG. 10 is the correlation between dynamic testing performance and crystal structure for the embodiment alloys, (a) written signal (CNR) versus lattice constant a, (b) DC erasability versus c/a ratio.

DETAILED DESCRIPTION OF THE INVENTION (1) Alloy Design

The designed and studied alloy compositions are shown by the area bounded by points I, II, III and IV in FIG. 2. There are two series of compositions: A, B, C, D, and E along the $Sb_7Te_3$—GaSb tie-line (tie line 1); and compositions F, Q H, I, and J along the $Sb_2Te_3$—GaSb tie line (tie line 2). All of them can be represented by the formulae:

$35 \leq x \leq 80; 40 \leq y \leq 50; 0.05 \leq z \leq 0.9$, whereas three Reference compositions locates at x=40, 70, z=0; and y=50, z=1 were designed to represent $Sb_2Te_3$, $Sb_7Te_3$ and GaSb, respectively.

(2) Preparation of Alloy Targets

Any methods known in the prior art can be used in the preparation of the designed alloys, and a target for forming a layer of the designed alloys of the present invention. The following examples are illustrative only, and not limitative of the remainder of the disclosure in any way whatsoever. GaSb, $Sb_7Te_3$ and $Sb_2Te_3$ alloy ingots was prepared by sealing high purity beads of Ga and Sb, and Sb and Te, respectively, in a predetermined weight ratio within a quartz tube, melting the elements by heating to 800-1000 degree C. while rotating and shaking the quartz tube, maintaining said heating temperature for one hour in the case of a small diameter quartz tube or for three hours for a larger quartz tube, and cooling the quartz tube.

The ingot obtained after cooling was heated again to a temperature 20 degree C. below the melting point of the alloy ingot for one week to carry out a homogenization heat treatment. The melting point of the alloy ingot was determined in advance by DSC analysis. The composition of homogenized alloy ingots was analyzed before further processing. The ingots were then pulverized into powders. The powder was compacted and sintered in a hot-press until a density qualified for the use as a sputtering target.

(3) Deposition of Thin Films

Any deposition methods known in the prior art can be used to form the recording layer of the optical disk of the present invention, which include (but not limited to) evaporation methods in vacuum such as thermal evaporation and E-beam evaporation; sputtering methods such as DC, RF, magnetron, symmetric, and non-symmetric sputtering, etc.; and vacuum ion plating. In the embodiments shown below, magnetron sputtering was adopted for the deposition of films. Two targets were used simultaneously, GaSb and $Sb_7Te_3$ for the compositions along tie line 1 (compositions A to E), while GaSb and $Sb_2Te_3$ for the compositions along tie line 2 (compositions F to J). Film composition was tuned and adjusted by the respective sputtering power of the targets.

Two different substrates were used, one was glass (Dow Corning #7059 glass) and the other was polycarbonate (PC). The recording layer was deposited directly on the substrate to 100 nm thickness.

The as deposited layers were amorphous. The crystallization of films was performed by laser heating in a commercial Initializer Machine.

(4) Analyses

The analyses were conducted for both the as deposited layers and the crystallized layers.

An Electron Probe X-ray Micro-Analyzer (EPMA) was used to quantitatively determine the composition of the deposited layer; a low angle X-ray diffractometer was used to analyze the structure of the deposited layers; and a photospectrometer was used to measure the reflectance (R) of the of the deposited layers. A differential scanning calorimeter (DSC) was used to conduct thermal analysis of the as deposited layers after they were stripped off from the substrates, wherein the crystallization temperatures of the amorphous layers were determined. Their crystallization activation energies were calculated from the shift of the exothermic peaks in the DSC curves resulting from different heating rates by the method of Kissinger's plot.

(5) Analysis Results

Table 1 is the quantitative analysis results of the films under study. The designation S7T3 represents $Sb_7Te_3$, S2T3 for $Sb_2Te_3$ and GS for GaSb. They were prepared as References. The compositions of A to J are denoted in the FIG. 2.

TABLE 1

| Compositions of thin films (in atomic percentage) | | | | |
|---|---|---|---|---|
| Sputtering Power | $Sb_7Te_3$—GaSb pseudo-binary alloys (tie-line 1) | | | |
| GaSb/$Sb_7Te_3$ | Ga | Sb | Te | Designation |
| 0/50 | — | 68.80 | 31.20 | Reference S7T3 |
| 25/50 | 6.32 | 68.01 | 25.67 | Example A |
| 50/50 | 13.68 | 65.14 | 21.18 | Example B |
| 50/25 | 23.82 | 63.18 | 13.00 | Example C |

TABLE 1-continued

| Compositions of thin films (in atomic percentage) | | | | |
|---|---|---|---|---|
| 75/25 | 30.38 | 59.77 | 9.85 | Example D |
| 75/15 | 37.91 | 56.24 | 5.85 | Example E |
| 50/0 | 48.79 | 51.20 | — | Reference GS |
| Sputtering Power | $Sb_2Te_3$—GaSb pseudo-binary alloys (tie-line 2) | | | |
| GaSb/$Sb_2Te_3$ | Ga | Sb | Te | Designation |
| 0/50 | — | 39.77 | 60.23 | Reference S2T3 |
| 25/50 | 5.90 | 42.19 | 51.91 | Example F |
| 50/50 | 12.03 | 44.90 | 43.07 | Example G |
| 50/25 | 20.68 | 48.25 | 31.07 | Example H |
| 75/25 | 27.58 | 49.49 | 22.93 | Example I |
| 75/15 | 35.29 | 51.54 | 13.17 | Example J |

Figure 3:
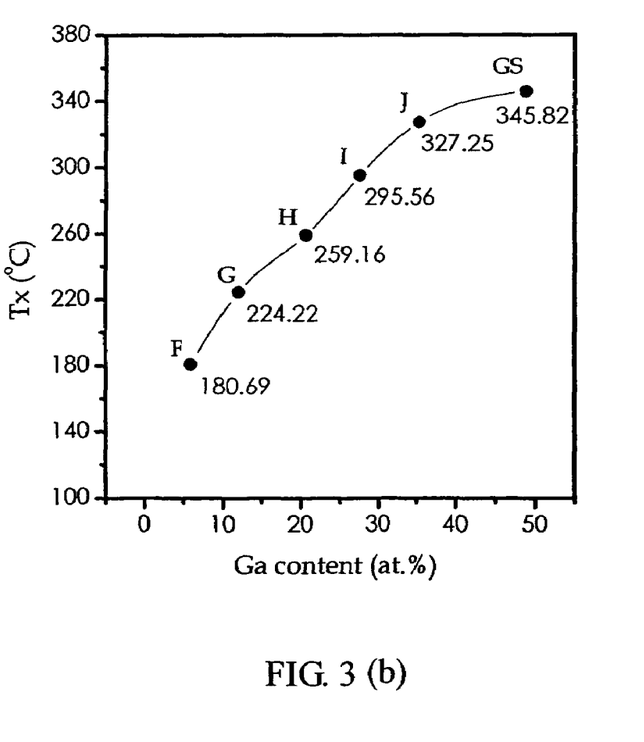
Figure 3A:
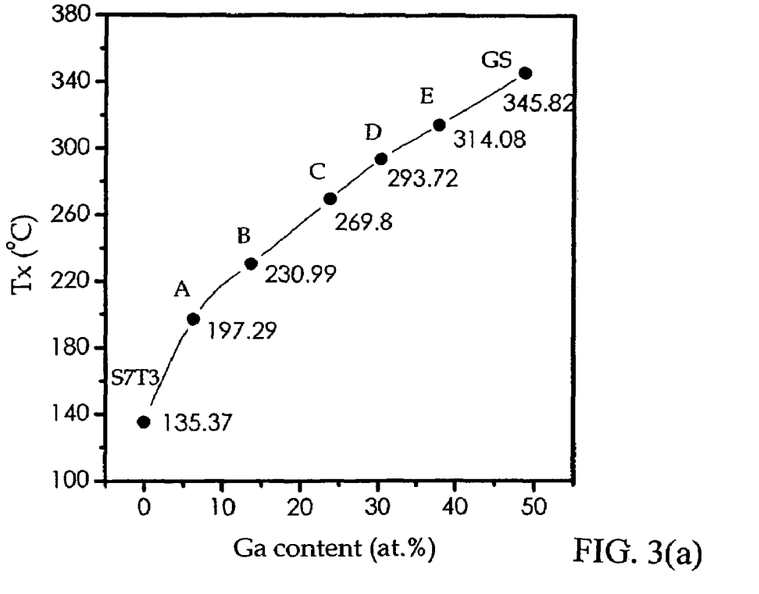

FIG. 3 shows crystallization temperature of the studied alloys. The peak temperature obtained at a heating rate 10° C./min was taken as the crystallization temperature. Shown in FIG. 1(a) are crystallization temperature of compositions along tie line 1 (A to E), while those in (b) are for compositions along tie line 2 (F to J). Whichever $Sb_7Te_3$—GaSb or $Sb_2Te_3$—GaSb systems, crystallization temperature shows the same increasing tendency with increasing amount of GaSb.

Figure 4A:
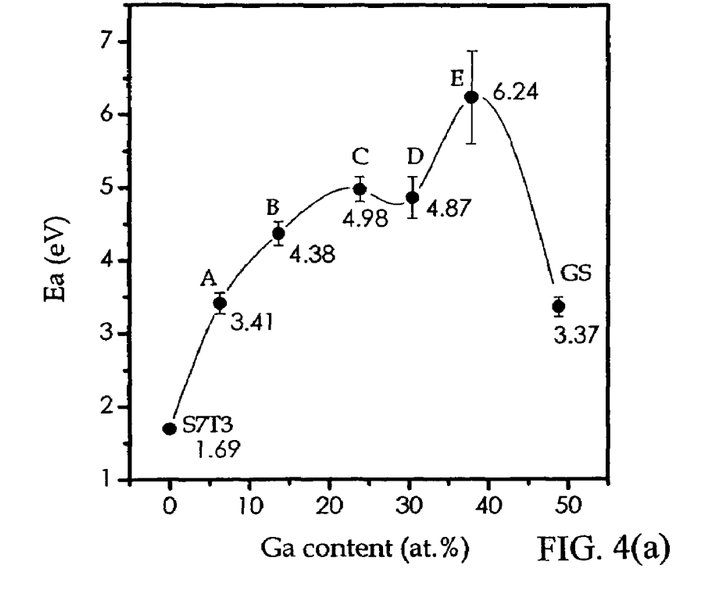
Figure 4B:
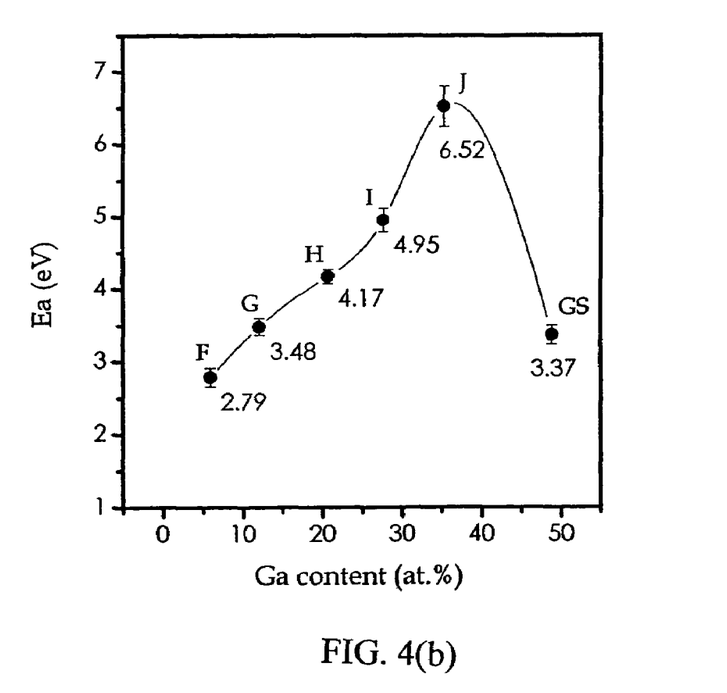

FIG. 4 shows activation energy (Ea) for crystallization for compositions along tie line 1 (a) and those along tie line 2 (b). The addition of GaSb enhances the activation energy. Taking tie line 1 as examples, Ea of $Sb_7Te_3$ is low, about 1.69 eV, with a small amount of GaSb addition, Ea is increased double (Composition A, 3.41 eV)∘For $Sb_2Te_3$, the as-deposited films are crystalline. Upon small addition of GaSb (Composition F), the as-deposited films turn amorphous depicting stabilization of amorphous phase by the addition of GaSb. Thermal analysis showed that GaSb facilitates stability of amorphous phase. Table 2 summarizes crystallization temperature (Tx) and activation energy of crystallization (Ea) for the studied alloys.

TABLE 2

| Crystallization temperature (Tx) and activation energy of crystallization (Ea) for the studied alloys | | |
|---|---|---|
| Alloys | Tx (° C.) | Ea (eV) |
| Reference S7T3 | 135 | 1.69 |
| Example A | 197 | 3.41 |
| Example B | 231 | 4.38 |
| Example C | 270 | 4.98 |
| Example D | 294 | 4.87 |
| Example E | 314 | 6.24 |
| Example F | 181 | 2.79 |
| Example G | 224 | 3.48 |
| Example H | 259 | 4.17 |
| Example I | 296 | 4.95 |
| Example J | 327 | 6.52 |
| Reference GS | 346 | 3.37 |

Figure 5A:
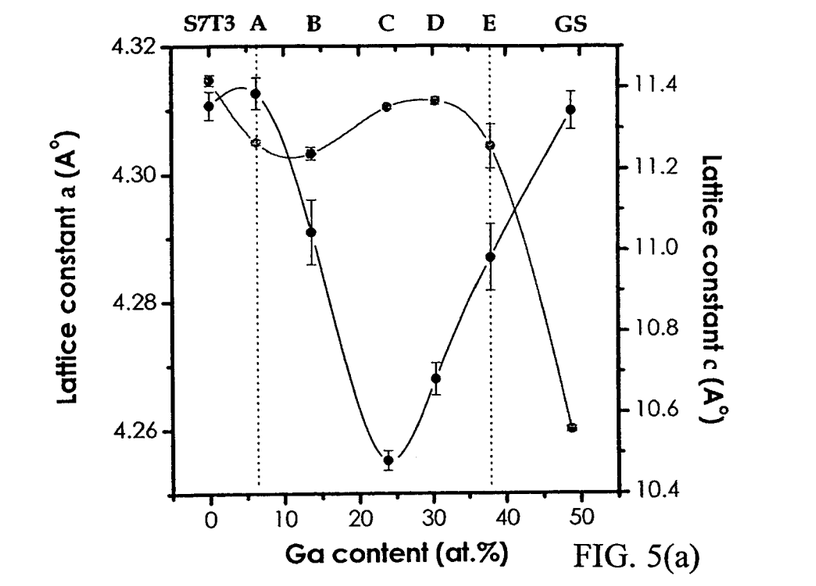
Figure 5B:
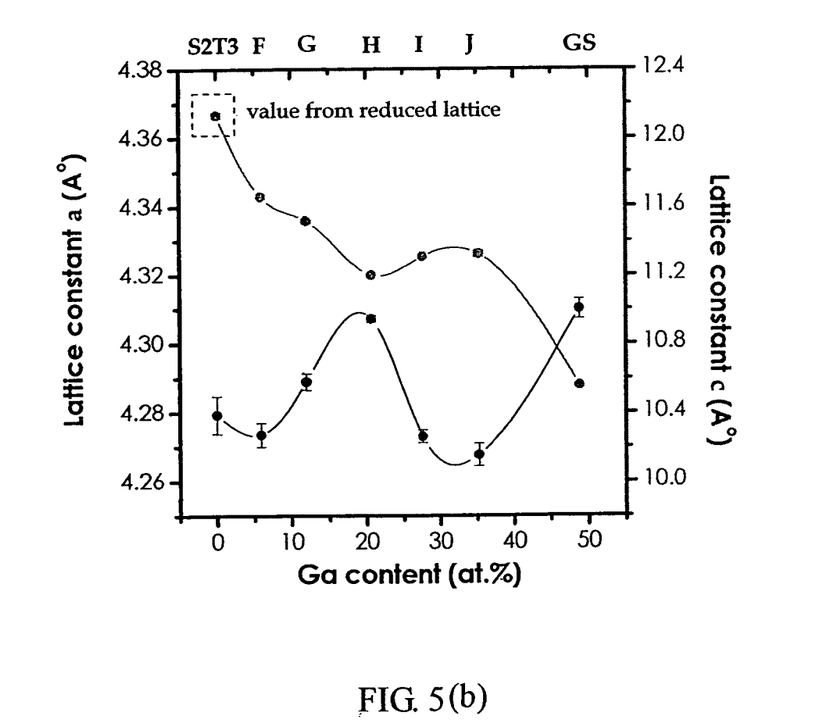

X-ray diffraction studies revealed that the crystallized phase of all the films (A to J) is single phase with hexagonal crystal symmetry. No second phases were identifiable. The unit cell composes of six atomic layers packed along c axis direction. FIG. 5 shows the lattice parameters versus compositions along tie-line 1(a), and tie-line 2 (b). GaSb belongs to face-centered cubic structure. In order for the simplicity of comparison, the structure of GaSb was transformed into the hexagonal notation along the [111] direction. In the mean time the stacking in $Sb_2Te_3$ along c-axis is also represented by the stacking length of six atomic layers. Table 3 shows the comparison of lattice paramenters. The lattice parameters, a is from 4.255 Å to 4.313 Å and c is from 11.200 Å to 11.657 Å, corresponding to the c/a ratio 2.60 to 2.73.

TABLE 3

Lattice constants a, c and c/a ratio of the hexagonal crystals

| Alloys | a (Å) | c (Å) | c/a |
|---|---|---|---|
| $Sb_7Te_3$—GaSb pseudo-binary alloys (tie-line 1) | | | |
| Reference S7T3 | 4.311 | 11.416 | 2.648 |
| Example A | 4.313 | 11.264 | 2.612 |
| Example B | 4.291 | 11.237 | 2.619 |
| Example C | 4.255 | 11.350 | 2.667 |
| Example D | 4.268 | 11.364 | 2.663 |
| Example E | 4.287 | 11.255 | 2.625 |
| Reference GS | 4.310 | 10.557 | 2.449 |
| $Sb_2Te_3$—GaSb pseudo-binary alloys (tie-line 2) | | | |
| Reference S2T3 | 4.279 | 12.133 | 2.835 |
| Example F | 4.274 | 11.657 | 2.728 |
| Example G | 4.289 | 11.518 | 2.685 |
| Example H | 4.307 | 11.200 | 2.600 |
| Example I | 4.273 | 11.306 | 2.646 |
| Example J | 4.268 | 11.322 | 2.653 |

(6) Fabrication and Dynamic Testing of Optical Disks

Figure 6:
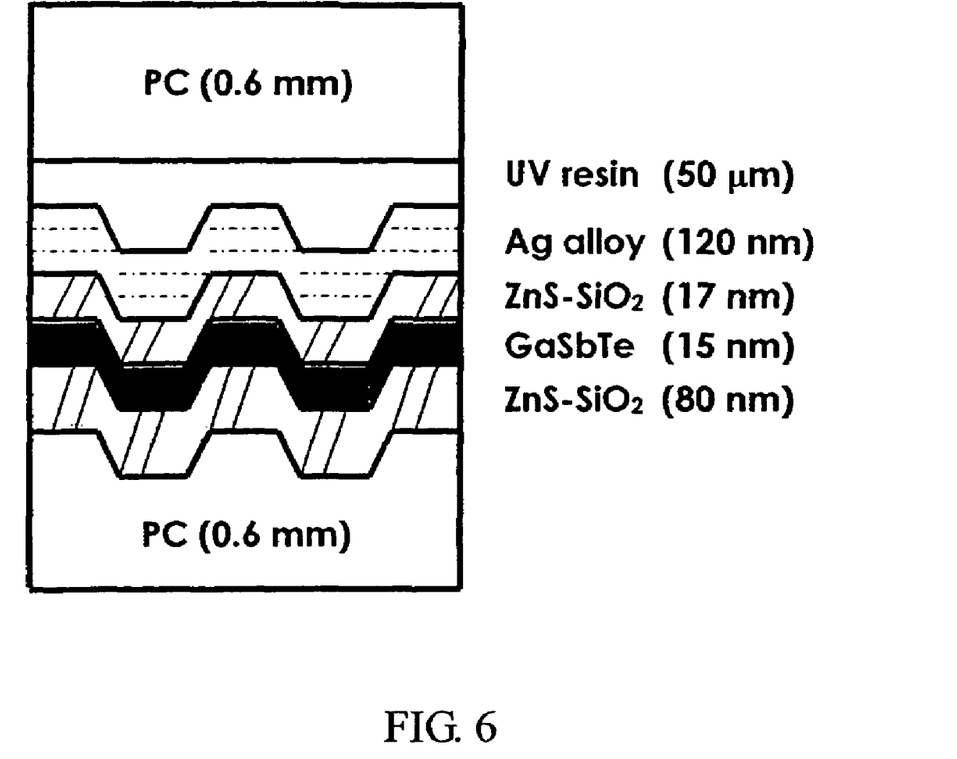
FIG. 6 is the schematic structure of disks prepared for dynamic writing-erasing tests.

Several phase-change optical disks in the format of DVD+RW were fabricated by using the optimal compositions from the above studies as composition of the recording layer. The structure of the optical disk, shown in FIG. 6, is composed of four layers deposited on a 0.6 mm PC substrate, and they were a lower dielectric layer of $ZnS$—$SiO_2$ (150 nm), the recording layer (20 nm), an upper dielectric layer of $ZnS$—$SiO_2$ (15 nm) and a reflective layer of aluminum (80 nm). Finally, another blank substrate was bonded to the deposited substrate to complete the fabrication of the optical disk. The recording-erasing characteristics were evaluated on initialized disks by a dynamic tester having an optical head with a laser wavelength of 657 nm and a focused laser spot of 0.55 μm. The disk rotated at 3.5 m/s. The writing was done by pulsed laser at 4.36 MHz. Carrier-to-noise ratio (CNR) was measured. DC erase on recorded marks of optimum write power was applied to measure the erase ratio (ER). The ER is defined as the difference in CNR between the recorded and erased signals.

Figure 7:
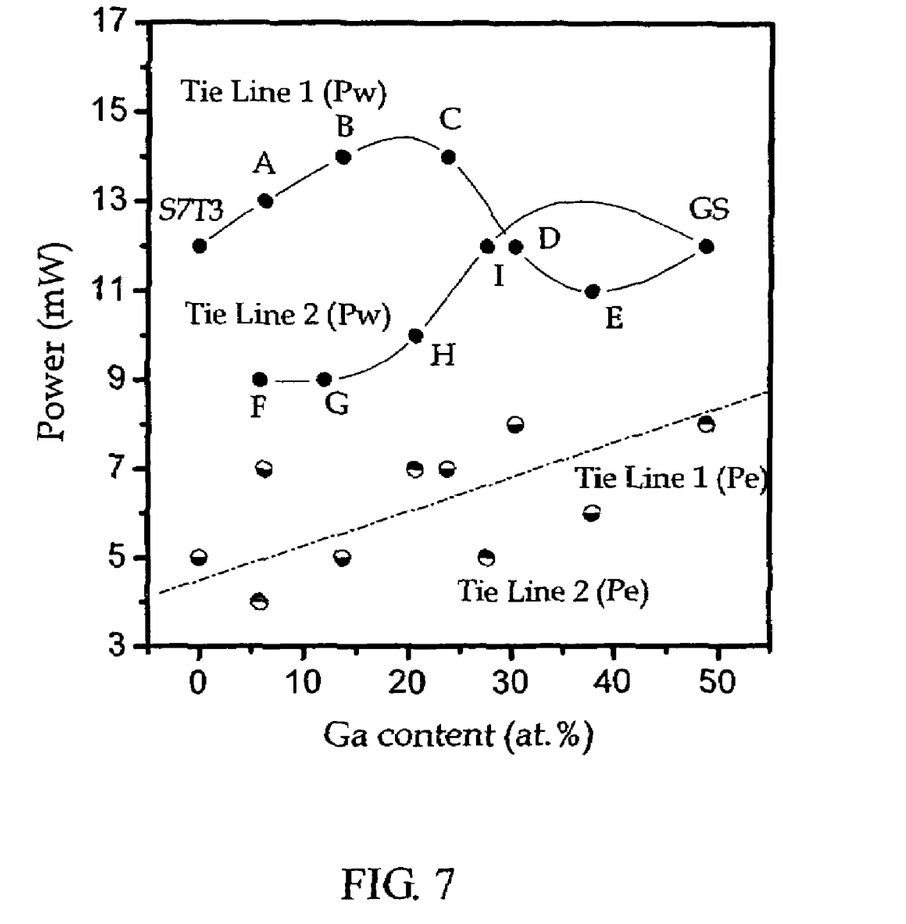
FIG. 7 is the optimum laser power for writing ($P_w$) and the optimal laser power for erasing ($P_e$) of the disks with functional layer prepared from the alloy compositions shown in the Examples and References.

FIG. 7 shows the optimal laser powers for writing (Pw) and erasing (Pe) of the Examples and the References. Optimal Pw changes with composition. Taking compositions on tie-line 1 as example, the optimal Pw increases first then decreases with increasing GaSb content. While for compositions on tie-line 2, the optimal Pw increases with increasing GaSb content. The composition dependent for optimal Pe is more scattering yet shows increasing trend with higher GaSb content.

Figure 8:
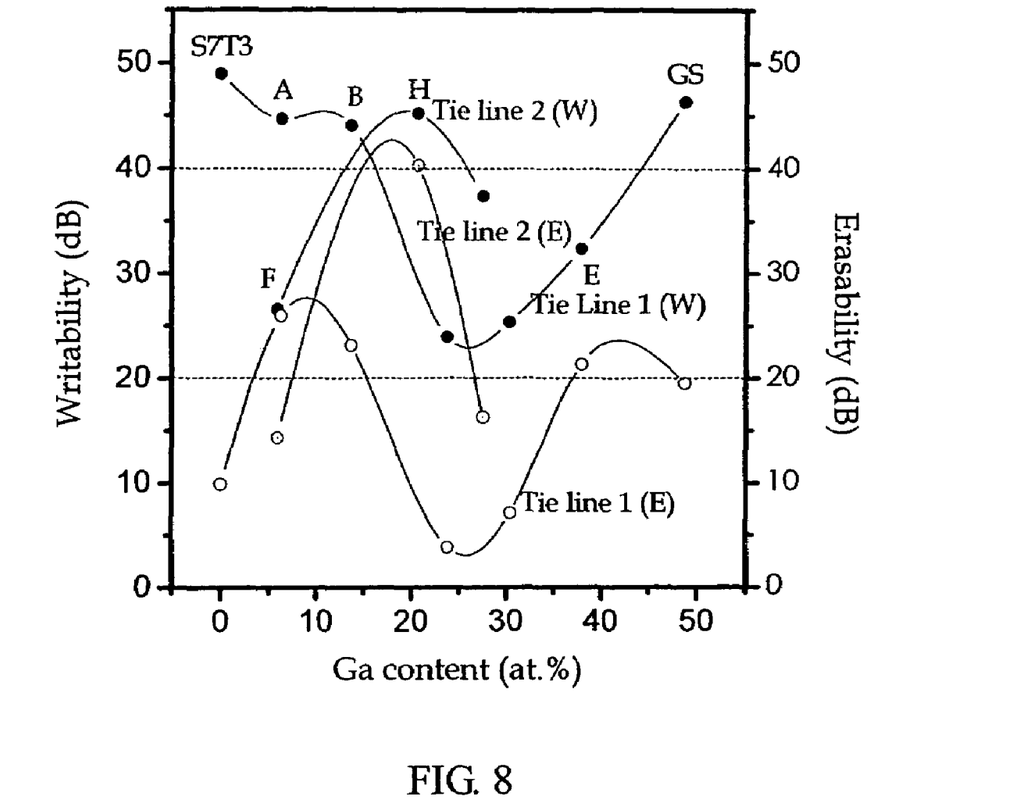
FIG. 8 is the writing capability (CNR) and erasure performance (ER) of optical disks prepared from the alloy compositions shown in the Examples and References.

FIG. 8 shows performance of writability and erasability for the studied compositions. The writability denotes the CNR ratio of the written information with the optimal laser power, while the erasability denotes the decreased CNR after erasing with the optimal erase power (ER, erase ratio). The results denote that Examples A, B and H have the best performance among all. By comparing Examples A, B and the Reference S7T3, we find that although CNR decreases a little (about 4~5 dB) upon the increased addition of GaSb, the erasability is manifestly enhanced (about 15 dB). This depicts that crystallization ability is highly enhanced due to the incorporation of GaSb. Transmission electron microscopy (TEM) studies showed that the recorded spot of the Reference S7T3 is ellipse-shaped, while that of Example A bell-shaped, Example B crescent-shaped. This elucidates that the addition of GaSb enhances the crystallization capability at the ends of the recorded trace, that is to say the rate of grain growth is enhanced. After erasing, recorded traces are readily visible on the disks of Reference S7T3 under TEM, while not on Examples A and B. This is consistent with the higher erasability of Examples A and B. Example H demonstrating excellent writing-erasing performance, with writing CNR 46 dB and erasing ER as high as 40 dB, has a bell-shaped recorded spots hence belongs to growth driven crystallization. It is the best composition in the present invention.

Figure 9:
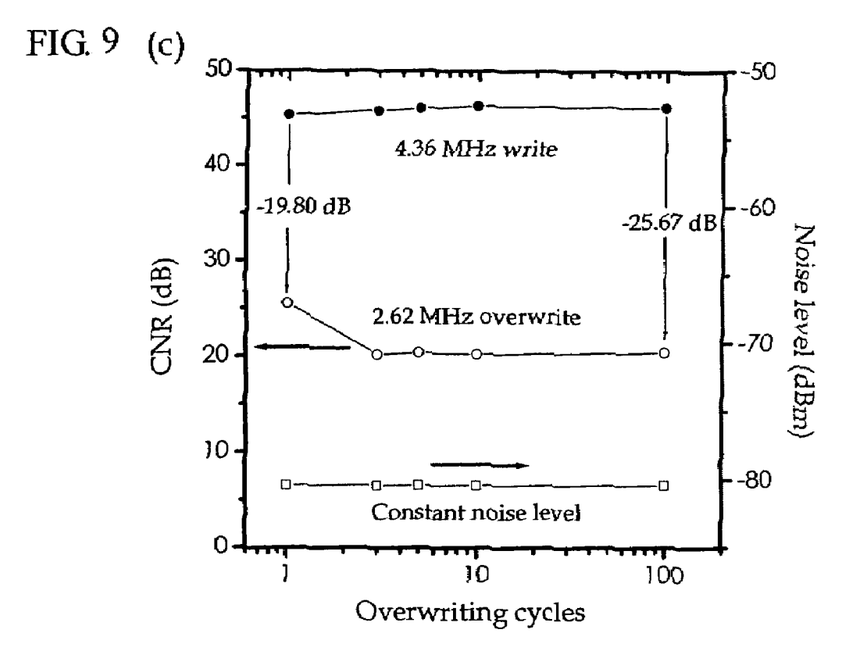
Figure 9A:
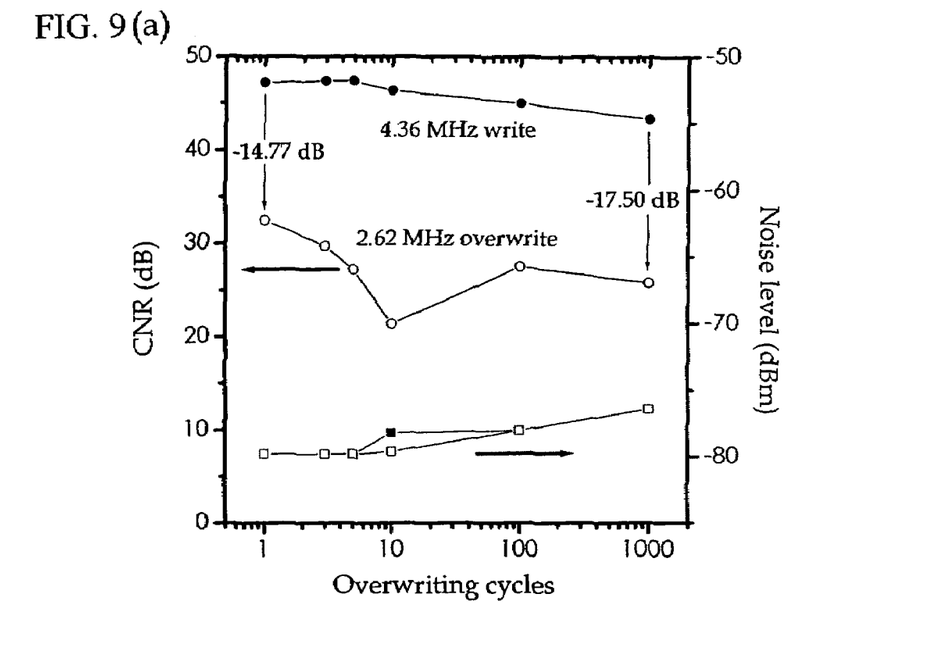
Figure 9B:
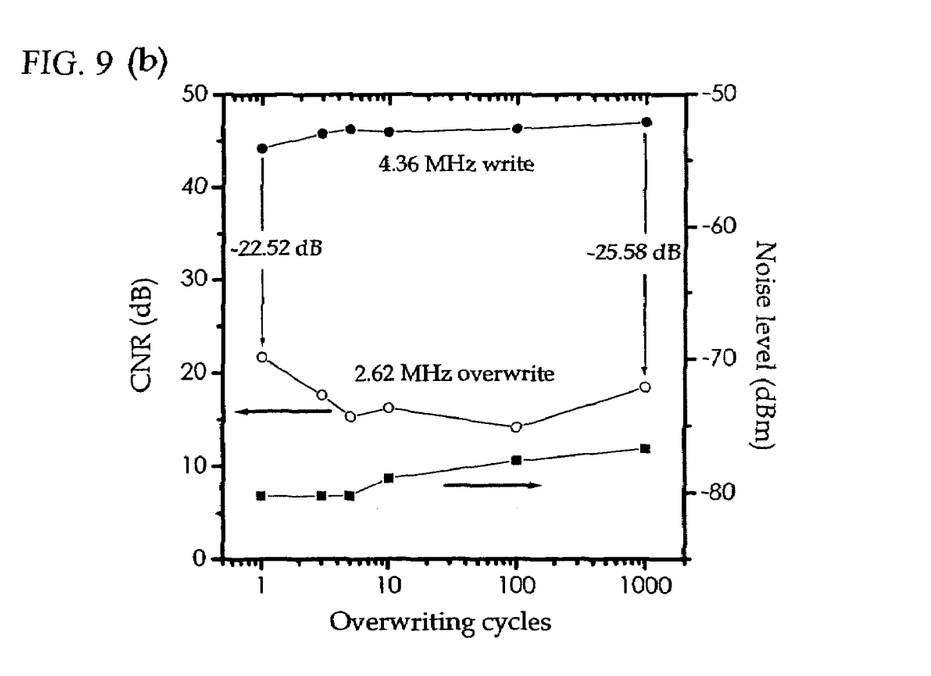

FIG. 9 shows cyclic writing-erasing test results of Examples A (a), B (b) and H (c). Before the cyclic tests, writing was performed using a frequency of 4.36 MHz then over-writing using a frequency of 2.62 MHz, then the original recoded signals were measured. The difference in signals before and after the over-writing is defined as the erasability. Examples A and B show less performance than that of Example H in erasbility.

Figure 10A:
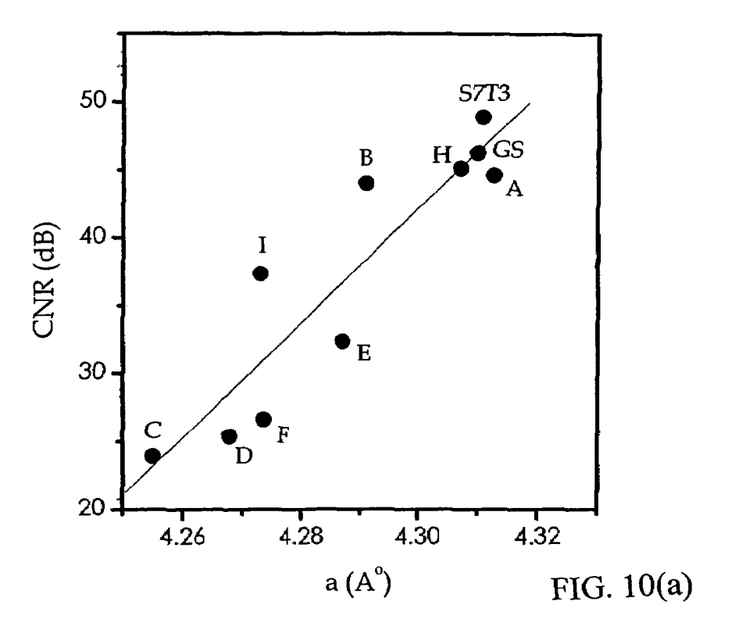
Figure 10B:
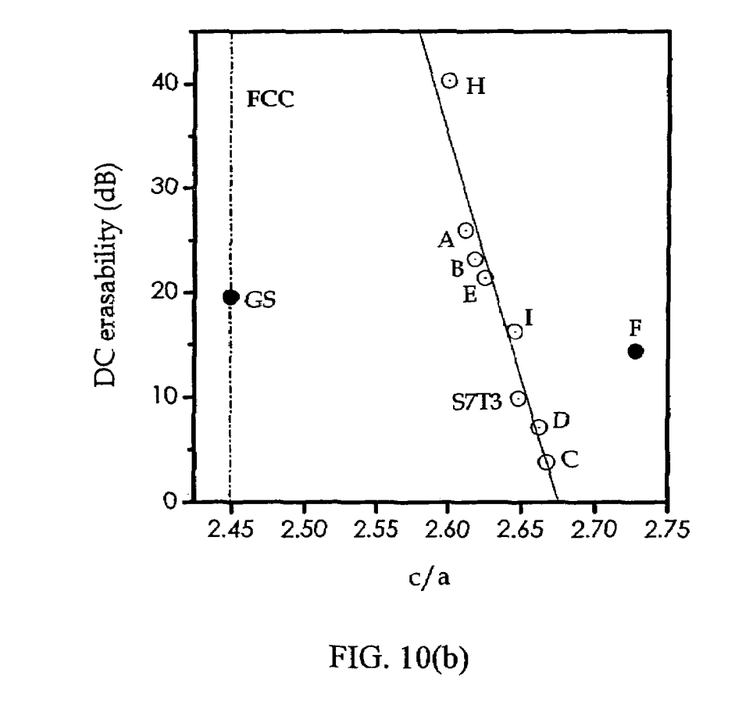

We found that cyclic testing performance is correlated with the lattice parameters a and c/a. FIG. 10 depicts such a relationship. The writing CNR signal increases with increasing a (a), while the DC erasability increases with decreasing c/a (b). Table 4 summarizes the results of dynamic testing.

TABLE 4

Results of dynamic testing on disks using the indicated alloys as the functional layer

| Alloys | $P_w$ (mW) | $P_e$ (mW) | CNR (dB) | ER (dB) |
|---|---|---|---|---|
| Reference S7T3 | 12 | 5 | 48.94 | 9.91 |
| Example A | 13 | 7 | 44.69 | 25.97 |
| Example B | 14 | 5 | 44.06 | 23.17 |
| Example C | 14 | 7 | 23.92 | 3.81 |
| Example D | 12 | 8 | 25.39 | 7.11 |
| Example E | 11 | 6 | 32.39 | 21.36 |
| Example F | 9 | 4 | 26.61 | 14.36 |
| Example H | 10 | 7 | 45.19 | 40.27 |
| Example I | 12 | 5 | 37.36 | 16.28 |
| Reference GS | 12 | 8 | 46.31 | 19.55 |

(7) Summary and Effectiveness of the Present Invention

We disclose in this invention a new phase change medium based on Ga—Sb—Te ternary alloys, consisting of compositions lie one the tie-lines $Sb_7Te_3$—GaSb and $Sb_2Te_3$—GaSb. After laser annealing, the crystallized phase is hexagonal with lattice parameters a 4.255~4.313 Å, c 11.200~11.657 Å, and c/a ratio 2.60 to 2.73.

The addition of GaSb into $Sb_2Te_3$ effectively increases crystallization temperature (181~327° C.), activation energy of crystallization (2.8~6.5 eV) as well as the stabilization of amorphous phase.

From the results of dynamic tests, we found that the addition of 30 at. % GaSb (Ga 15 at. %) into $Sb_7Te_3$ the crystallization rate is effectively enhanced. This in turn improves erasability. Over addition of GaSb deteriorates the performance. Furthermore a $Ga_{21}Sb_{48}Te_{31}$ composition (Example H, very close to a simplified formulae $Ga_2Sb_5Te_3$) in the Ga—Sb—Te system shows the best writing-erasing capability.

We worked out a relation between the cyclic writing-erasing performance and the lattice parameters. The compositions with lower c/a ratios show higher erasabilty. For the embodiments disclosed, the optimal c/a lies in between 2.60 and 2.65.

One who is skillful in this art can easily elucidate that the addition of 0.5~10 atomic percent to replace in part one of Ga, Sb or Te may further improve the performance once the crystal structure is not destroyed. Hence we claim that the replacement with any or combinations of Ge, Bi, Sn, Se, B, C, N, In, Ag, Au to partly substitute Ga, Sb or Te to adjust the crystal structure such that lattice parameter a lies within 4.255~4.313 Å, c/a ratio lies within 2.60~2.73 is within the scope of protection of the present invention.

Although the present invention has been described with reference to specific details of certain embodiments thereof, it is not intended that such details should be regarded as limitations upon the scope of the invention except as and to the extent that they are included in the accompanying claims. Many modifications and variations, specifically minor alterations in compositions around the optimal ones depicted herewith, are possible in light of the above disclosure.

What is claimed is:

1. An optical recording medium for high density phase change optical recording, said medium comprising gallium (Ga), antimony (Sb) and tellurium (Te) and unavoidable impurities, and having the following composition which is within the regions bounded by the broken lines in FIG. 2:

$$(Sb_xTe_{100-x})_{1-z}(Ga_ySb_{100-y})_z$$

$35 \leq x \leq 55; 40 \leq y \leq 50; 0.05 \leq z \leq 0.9$ said medium having:
(1) single hexagonal phase after crystallization with lattice constant a ranging from 4.25 to 4.32 Å, c ranging from 11.200 Å to 11.657 Å, c/a ratio 2.58 to 2.72;
(2) high grain growth rate in crystallization;
(3) optimal activation energy of crystallization 3.0 to 6.3 eV; and
(4) greater than 30 dB in writing CNR, and greater than 20 dB in erasure CNR.

Figure 11:
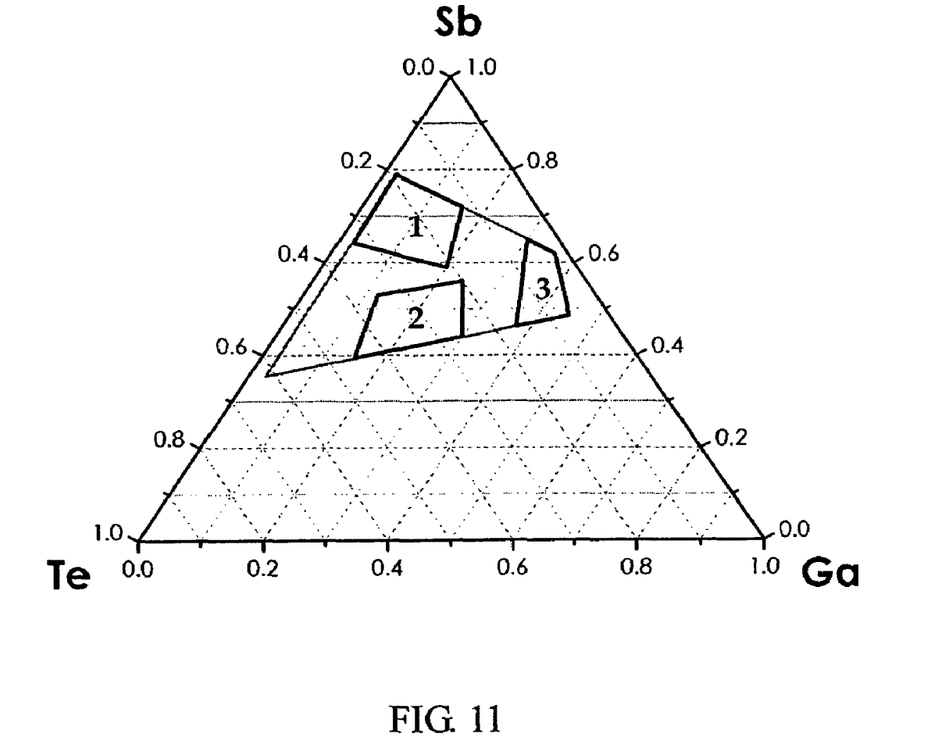
FIG. 11 is the composition ranges of the claimed alloys in the present invention.

2. An optical recording medium for high density phase change optical recording, said medium comprising gallium (Ga), antimony (Sb) and tellurium (Te) and unavoidable impurities, and having the following composition:

$$(Sb_xTe_{100-x})_{1-z}(Ga_ySb_{100-y})_z$$

wherein
$35 \leq x \leq 50; 40 \leq y \leq 50; 0.30 \leq z \leq 0.60$; and
the composition is within Region 2 in FIG. 11, has c/a ratio within 2.58-2.65 after crystallization, greater than 40 dB in writing CNR, and is suitable for re-writable optical disks;
said medium having:
(1) a single hexagonal phase after crystallization with lattice constants a ranging from 4.25 to 4.32 Å, c ranging from 11.200 Å to 11.657 Å;
(2) a high grain growth rate in crystallization;
(3) optimal activation energy of crystallization ranging from 3.0 to 6.3 eV; and
(4) greater than 20 dB in erasing CNR.

3. An optical recording medium for high density phase change optical recording, said medium comprising gallium (Ga), antimony (Sb) and tellurium (Te) and unavoidable impurities, and having the following composition:

$$(Sb_xTe_{100-x})_{1-z}(Ga_ySb_{100-y})_z$$

wherein
$35 \leq x \leq 50; 40 \leq y \leq 50; 0.75 \leq z \leq 0.90$; and
the composition is within Region 3 in FIG. 11, has c/a ratio within 2.60-2.65 after crystallization, and is suitable for re-writable optical disks;
said medium having:
(1) a single hexagonal phase after crystallization with lattice constants a ranging from 4.25 to 4.32 Å, c ranging from 11.200 Å to 11.657 Å;
(2) a high grain growth rate in crystallization;
(3) optimal activation energy of crystallization ranging from 3.0 to 6.3 eV; and
(4) greater than 30 dB in writing CNR, and greater than 20 dB in erasing CNR.

4. The composition as claimed in claim 1, wherein Ga, Sb, and Te are replaced in part by 0.5~10 at. % by one or more of In, Ag, Au, Bi, Sn, Ge, B, C, N once the crystallized hexagonal phase has been sustained with a within 0.425 to 0.432 nm, and c/a ratio within 2.58 to 2.72.

* * * * *